US006751298B2

(12) United States Patent
Bhogal et al.

(10) Patent No.: US 6,751,298 B2
(45) Date of Patent: Jun. 15, 2004

(54) LOCALIZED VOICE MAIL SYSTEM

(75) Inventors: Kulvir Singh Bhogal, Forth Worth, TX (US); Nizamudeen Ishmael, Jr., Austin, TX (US); Javid Jameossanaie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 09/895,091

(22) Filed: Jun. 29, 2001

(65) Prior Publication Data

US 2003/0002632 A1 Jan. 2, 2003

(51) Int. Cl.$^7$ .......................... H04M 1/64; H04M 11/10
(52) U.S. Cl. .................. 379/88.13; 379/88.14; 379/88.16; 379/88.22; 455/412.1; 455/413
(58) Field of Search .................. 455/412.1, 412.2, 455/413; 379/88.17, 88.22, 88.13, 88.23, 88.25, 88.16

(56) References Cited

U.S. PATENT DOCUMENTS

| 5,177,780 A | 1/1993 | Kasper et al. ............... 455/413 |
| 5,418,835 A | 5/1995 | Frohman et al. ............ 455/513 |
| 5,790,957 A | 8/1998 | Heidari .................... 455/533.1 |
| 5,797,098 A | 8/1998 | Schroeder et al. .......... 455/464 |
| 5,842,141 A | 11/1998 | Vaihoja et al. .............. 455/574 |
| 6,014,559 A | 1/2000 | Amin ......................... 455/413 |
| 6,108,534 A | 8/2000 | Bourgeois et al. .......... 455/419 |
| 6,148,193 A | 11/2000 | Miska et al. ................ 455/410 |
| 6,549,612 B2 * | 4/2003 | Gifford et al. ........... 379/88.13 |
| 6,636,733 B1 * | 10/2003 | Helferich .................... 455/466 |
| 2002/0077082 A1 * | 6/2002 | Cruickshank ............... 455/413 |

* cited by examiner

*Primary Examiner*—Ovidio Escalante
(74) *Attorney, Agent, or Firm*—Mark S. Walker; Streets & Steele; Jeffrey L. Streets

(57) ABSTRACT

The present invention relates to a system and method for using a localized voice mail system that allows voice mail messages on a cellular telephone network to be stored on a remote server or other computer. These messages can be stored on a server of the cellular network or of the cellular telephone service subscriber. The method further entails downloading copies of the stored messages into another computer or a cellular telephone's memory. In this embodiment, a cellular telephone can retrieve voice mail messages even when the cellular telephone is roaming or cannot pick up a carrier signal. In another embodiment, a method is described for organizing voice mail messages stored in a cellular telephone's memory into convenient groups, directories or folders formatted to be compatible with the computer and cellular telephone.

14 Claims, 11 Drawing Sheets

LOCALIZED VOICE MAIL SYSTEM

FIELD OF THE INVENTION

The present invention relates to voice mail systems. More specifically, the present invention relates to a method and apparatus for remote management of voice messages from a voice mail system, such as through use of a cellular telephone.

BACKGROUND OF THE INVENTION

Currently some wireless services offer message waiting and similar services where voice mail messages can be stored in a voice mail system and delivered through a wireless communication network, such as a cellular telephone network, after a call is specifically made to the voice mail system to retrieve the voice mail messages. In some systems, the number of stored voice mail messages can be determined by looking at the display of a phone that has been powered-on. However, knowing only the number of voice mail messages stored in a voice mail system is not sufficient for active users and subscribers who need up-to-date information for business, education and other purposes. Furthermore, such a system has no advantage at all if the cellular telephone is roaming out of its calling area or cannot obtain a carrier signal. If the cellular telephone is roaming, then the cellular telephone network providing the roaming service has no knowledge of whether that cellular telephone has messages waiting in a voice mail system of another cellular provider. Of course, if the cellular telephone is outside the service area of any cellular network, then the cellular telephone cannot make any calls, much less retrieve information concerning voice mail messages.

Existing cellular network voice mail systems can forward a voice mail message notification (or message waiting indicator) to a subscriber of a voice mail system indicating that the subscriber has one or more voice mail messages waiting for retrieval. This notification can include additional information such as caller ID, the calling number of the party leaving the voice mail message, and an index listing the various messages so that a subscriber can scroll through them and retrieve a particular voice mail message.

The addition of speech memory to a cellular telephone that is already provided with voice compression and expansion circuitry can act as a recording device during a conversation on the cellular telephone. Consequently, such a telephone could be used as an answering machine, wherein an incoming message is recorded in the memory and, upon the pushing of a button on the control pad of the telephone, the stored message is played back to a person utilizing the telephone.

However, these systems have not solved all the problems that exist in the field of cellular voice mail systems. There is an acute need for today's business people to have access to devices and systems that help them receive and manage voice mail messages while they are away from those locations that grant them direct access to their voice mail system. The devices must be capable of receiving and organizing information and conveniently providing the information to the user on demand and in a format appropriate to the message. Moreover, the devices must be dynamic and flexible, allowing the user to easily reconfigure them as needs change. For example, some users have different sets of information that must be available at different times and there is a need to easily change from one set to another, regardless of location.

There is a need for a method to contact the cellular telephone's voice mail system when the cellular telephone is roaming. What is also needed is a method for a cellular telephone to easily reach its voice mail messages when the cellular telephone cannot obtain a carrier signal. Additionally, a method is needed to archive voice mail messages by transferring voice mail messages from a cellular telephone's memory to another memory medium, such as a personal computer or another cellular telephone, whereby additional cellular telephone memory would be made available for other voice mail messages.

SUMMARY OF THE INVENTION

The present invention provides a system comprising a voice mail server for storing voice mail messages and a cellular telephone, personal computer, remote server or other computers that can retrieve copies of the stored voice mail messages and then transfer the voice mail messages between themselves. The system is configured to enable the cellular telephone to retrieve its voice mail messages from a voice mail server, remote server, personal computer or a second cellular telephone in computer readable format. In the present invention, a cellular telephone can retrieve voice mail messages from any service providing storage and retrieval of voice mail messages.

In one embodiment, the invention provides for a personal computer or a remote server to retrieve voice mail messages from a voice mail recorder/player. In this embodiment, a voice mail recorder/player cannot be synchronized with another computer and is capable of delivering voice mail messages only in spoken voice format (i.e., non-computer readable format). The personal computer or remote server, using a conventional modem or other communication medium, establishes a connection with the voice mail recorder/player and records the voice mail messages in a computer readable format, such as WAV or MP3. A cellular telephone can then retrieve the voice mail messages from the personal computer or remote server by connecting to the personal computer or remote server over the Internet or other computer network or connection. The connection by the remote server or personal computer to the voice mail recorder/player may be established automatically at set point intervals or, alternatively, may be established manually.

In another embodiment, a voice mail message may be stored on a voice mail server in computer readable format. A personal computer, remote server, or cellular telephone may then synchronize with the voice mail server and retrieve voice mail messages in computer readable format, such as WAV. The remote server or personal computer may retrieve the voice mail messages through the Internet using a conventional browser. A cellular telephone may retrieve the voice mail messages through the Internet using a conventional microbrowser.

Similarly the invention provides for a first cellular telephone to transmit voice mail messages to a second cellular telephone in computer readable format. This can be especially useful if the voice mail message contains detailed instructions, directions or is a group of many voice mail messages, because the transfer of the voice mail message in computer readable format can be performed quicker than if transmitted as a voice transmission.

Additionally the invention provides for a cellular telephone to synchronize with a personal computer to transfer voice mail messages between the two devices, to arrange them into convenient groups, files, or directories in the personal computer, and then to download these conveniently grouped voice mail messages to the cellular telephone's memory, thereby facilitating local retrieval of a voice mail message when needed.

BRIEF DESCRIPTION OF THE DRAWINGS

So that the features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not be considered limiting of its scope, for the invention may admit to other equally effective embodiments.

DETAILED DESCRIPTION OF THE INVENTION

Figure 1:
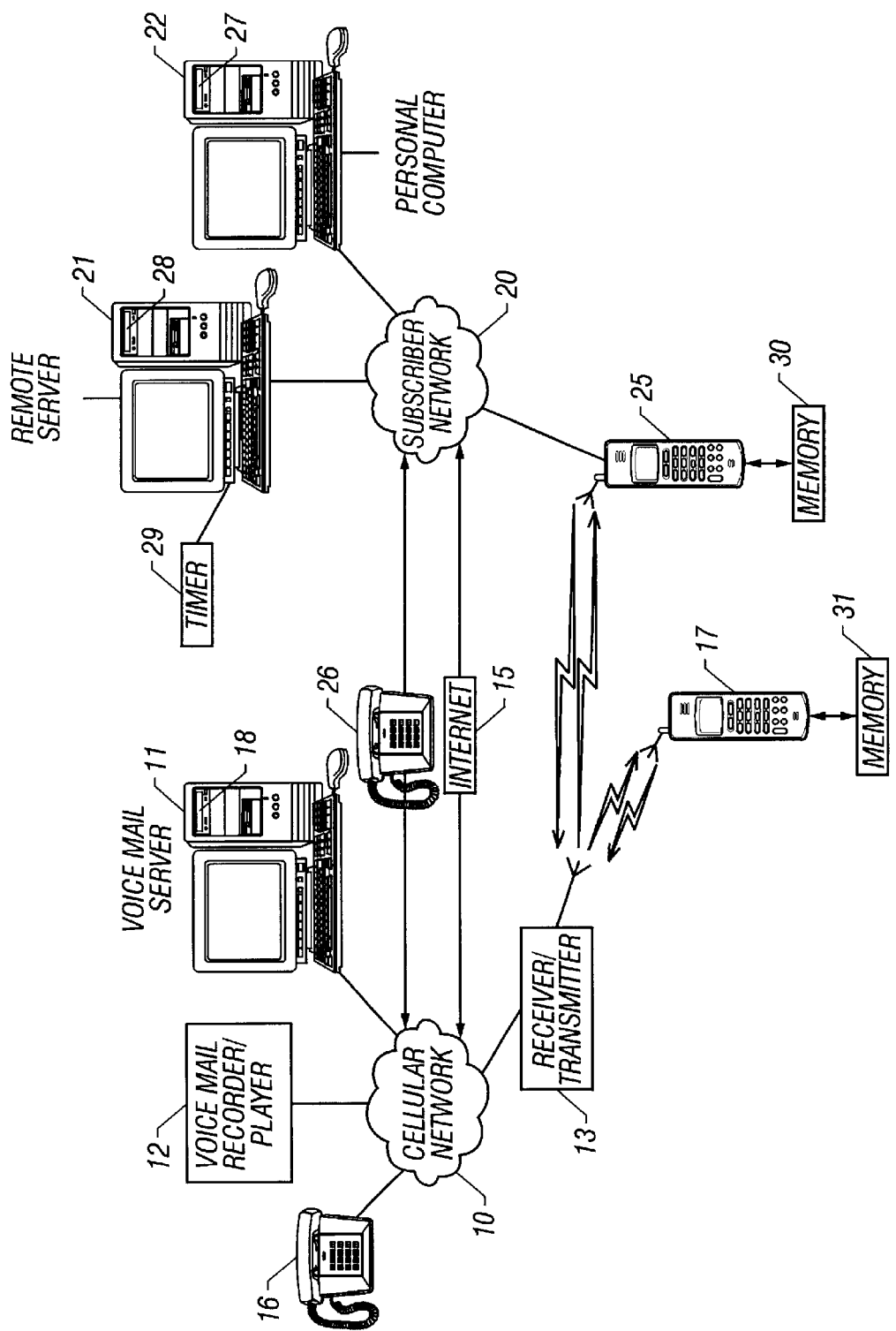
FIG. 1 is a schematic diagram showing the system of the present invention.

The present invention relates to a method for transferring messages in computer readable format, such as WAV, between a personal computer or server and a cellular telephone to retrieve voice mail messages from a voice mail system. Callers who can't reach a cellular telephone, either because it was turned off, out of the service area, or unanswered, often leave messages in a voice mail system for later retrieval by the cellular telephone user. In the method of the present invention, voice mail messages are converted to computer readable format and stored on the voice mail system's server. The voice mail messages can then be downloaded into another remote server, a personal computer, or a cellular telephone when they are connected, via the Internet or other means, to the voice mail system's server.

The present invention also relates to a method for transferring voice mail messages in computer readable format, such as WAV, between one cellular telephone and another cellular telephone. This permits the rapid transfer of information, which may contain detailed instructions or directions, directly to a cellular telephone's memory from another cellular telephone's memory, without having to take the time to play the information over the airwaves.

The present invention also describes a method for a remote server to connect to a voice mail system and download any stored voice mail messages assigned to a particular subscriber. A cellular telephone can then be connected to the remote server to retrieve the voice mail messages and store the messages in its own local memory. This method has the advantage of allowing a cellular telephone to collect current voice mail messages from the remote server even when the cellular telephone is out of its service area, either because it is roaming or because it cannot pick up a carrier signal.

Additionally, the present invention describes a method for organizing voice mail messages, stored in a computer or in a cellular telephone's memory, into convenient groups, directories, or folders formatted in a way to be compatible between the computer and the cellular telephone's memory. Voice mail messages are downloaded from the cellular telephone for archiving, thereby freeing up memory available for storing voice mail messages on the server. Other voice mail messages can be uploaded to the cellular telephone, for example, new voice messages stored on the personal computer or old messages that had been archived on the personal computer. Groups, folders, or directories created on the computer and voice mail messages stored in them may be uploaded to the cellular telephone to facilitate voice mail message retrieval when needed.

The present invention is not limited only to retrieving messages from a cellular network voice mail system. Any voice message service that allows a service subscriber to retrieve messages left by an outside caller is applicable to the present invention. The present invention provides a solution for managing voice mail messages by allowing a cellular telephone access to its assigned voice mail messages whenever and wherever desired and further provides a powerful means for storing and manipulating voice mail messages for greater efficiency and convenience.

FIG. 1 is a schematic diagram showing the system of the present invention. The cellular network 10 interconnects the various components of the cellular network's system. The pertinent components to the present invention includes a voice mail recorder/player 12 to record messages left by outside callers 16 when they fail to establish a connection with a cellular telephone, either because it was turned off, was outside the service area, or not answered. A voice mail server 11 alternatively can record, in a computer readable format, a voice mail message left by the outside caller 16 and store it on a drive 18 made of a computer readable medium. The voice mail server 11 can be connected to the Internet 15 enabling a voice mail system subscriber to retrieve voice mail messages by accessing a cellular network's web page via a cellular telephone 25, personal computer 22 or another remote server 21. A receiver/transmitter 13 sends and receives conversations or voice mail messages to or from a cellular telephone 25, an outside caller 16 or another cellular telephone 17, thereby allowing a cellular system subscriber to converse over a cellular telephone 25 or to retrieve voice mail messages from an assigned portion of the voice mail recorder/player 12. The system components may be connected by a network, such as a LAN (localized area network) or WAN (wide area network).

The subscriber's network 20 interconnects the various components of that network's system. The pertinent components include a cellular telephone 25 capable of communicating with a personal computer 22. Alternatively, the cellular telephone can be connected to a remote server 21 or any other computer suitable for such a connection. Voice mail messages are stored on the drive 27 of the personal computer 22 or the drive 28 of a remote server 21, or alternatively, any other suitable computer readable medium. Both the remote server 21 and the personal computer 22 are tied into the Internet 15, and therefore are accessible to a cellular telephone 25 that is connected to the Internet or the voice mail server 11. The remote server 21 can call the voice mail system 12 to retrieve messages through a telephone connection 26, using, for example, a modem. The system components may be connected by a network, such as a LAN (localized area network) or WAN (wide area network).

Both the subscriber's network 20 and the cellular network 10 are the media used to provide communication links between the various devices and computers interconnected within the systems. The networks 20, 10 may include permanent connections, such as wire or fiber optic cables, or temporary connections made through telephones or wireless communications. Personal computers and servers may be represented by a variety of computing devices, such as mainframes, personal computers, personal digital assistants (PDA's), and Internet-connected cellular telephones. The networks 10, 20 may include additional servers, routers and other devices not shown. Both systems 10, 20 are connected to the Internet 15 representing a worldwide collection of networks and gateways that use the TCP/IP suite of protocols to communicate with one another. Of course, the systems 10, 20 may also include a number of different types of networks, such as, for example, an intranet, a local area network (LAN), or a wide area network (WAN).

The present invention could be implemented in a variety of software environments. A typical operating system may be used to control program execution within the systems 10, 20. Furthermore, although the preferred embodiment described below includes a browser within the subscriber's network 20 as the agent that exchanges data in the security protocols with the cellular network. The browser does not have to be a conventional browser, e.g., Netscape Navigator® or Microsoft Internet Explorer®. In order to secure the information transmitted to and from the remote server, it may be capable of Public Key Infrastructure (PKI) technology exchanged in a security protocol such as the Secure Sockets Layer (SSL) version 3.0 and above.

The browser for the cellular telephone is a microbrowser. A microbrowser is an Internet browser designed for use with a wireless handheld device such as a cellular telephone. Microbrowsers have small file sizes to accommodate the low memory available to handheld devices and the low-bandwidth constraints of the wireless-handheld networks. Microbrowsers using the wireless application protocol (WAP) are available from, among others, Openwave Systems, Inc. of Redwood, Calif.

The voice mail server 11 includes a conventional server software program such as International Business Machines' Websphere®, for administering the interaction with equipment users. The server software includes application programs that enable the server 11 to manage the voice mail database, other databases, and execute various instructions in response to communications from various voice mail system users or subscribers.

Figure 2:
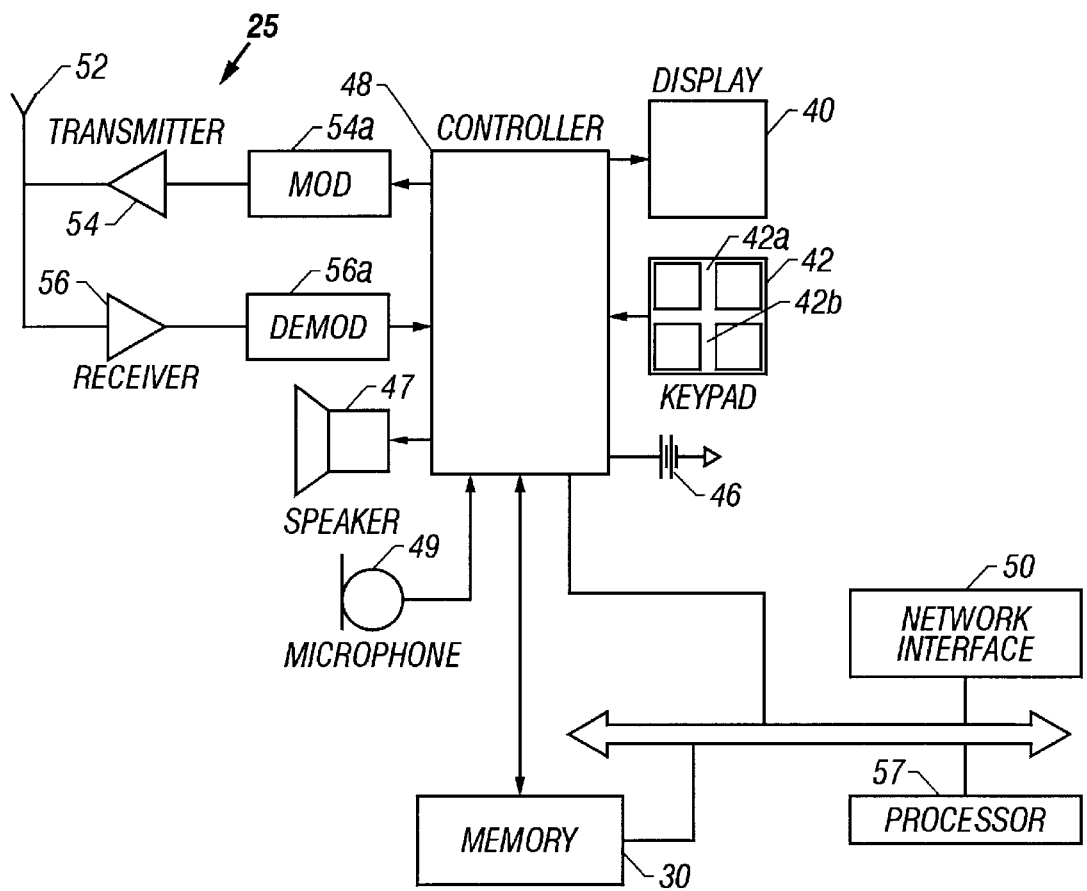
FIG. 2 is a block diagram of a typical cellular telephone.
Figure 3:
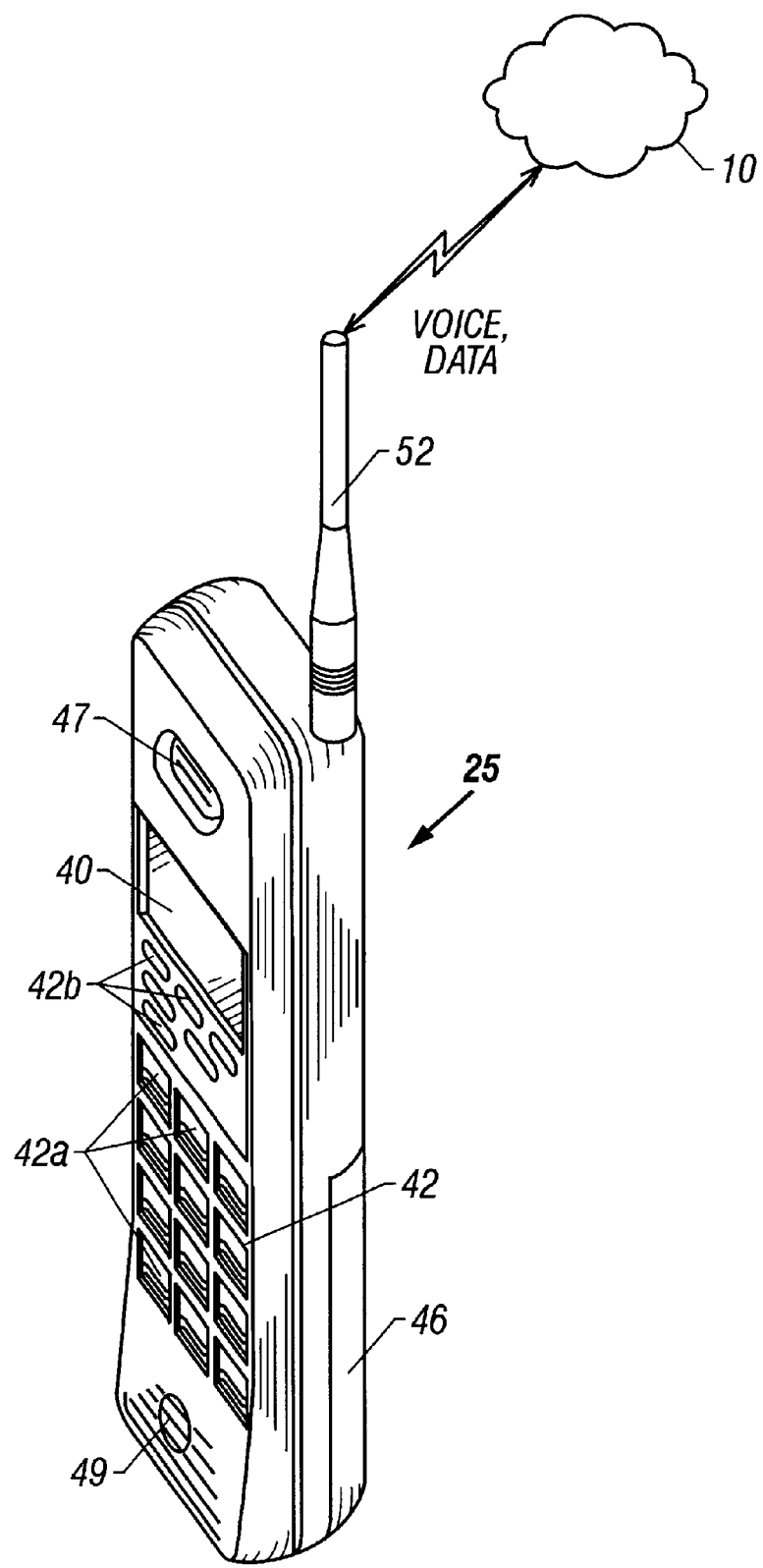
FIG. 3 is an elevation view of a typical cellular telephone.

FIGS. 2 and 3 depict a typical cellular telephone used in the present invention. The cellular telephone 25 includes an antenna 52 for transmitting signals to and from the cellular network 10. The cellular telephone 25 includes a modulator 54A, a transmitter 54, a demodulator 56A, a receiver 56, and a controller 48 that provides signals to the transmitter and receives signals from the receiver. These signals include speech and/or computer readable files. Also connected to the controller 48 are a conventional speaker 47 and microphone 49, a display 40, and an input device, typically a keypad 42. The keypad includes keys 42a, which are numeric and alphanumeric keys typically found on a telephone, and other keys 42b, used for operating the cellular telephone including, but not limited to, a power key, a SEND key, and various menu scrolling and soft keys. Also included is a processor 57 and a network interface 50, such as a conventional modem, and a battery power source 46.

The cellular telephone also includes memory 30 that stores the values of various cellular system parameters and the number assignment module (NAM). It also stores voice mail messages received from the cellular network or downloaded from the subscriber's network or received from another cellular telephone. The operating program in the memory 24 includes the microbrowser and routines to present, store, compress and decompress voice mail messages.

Figure 4:
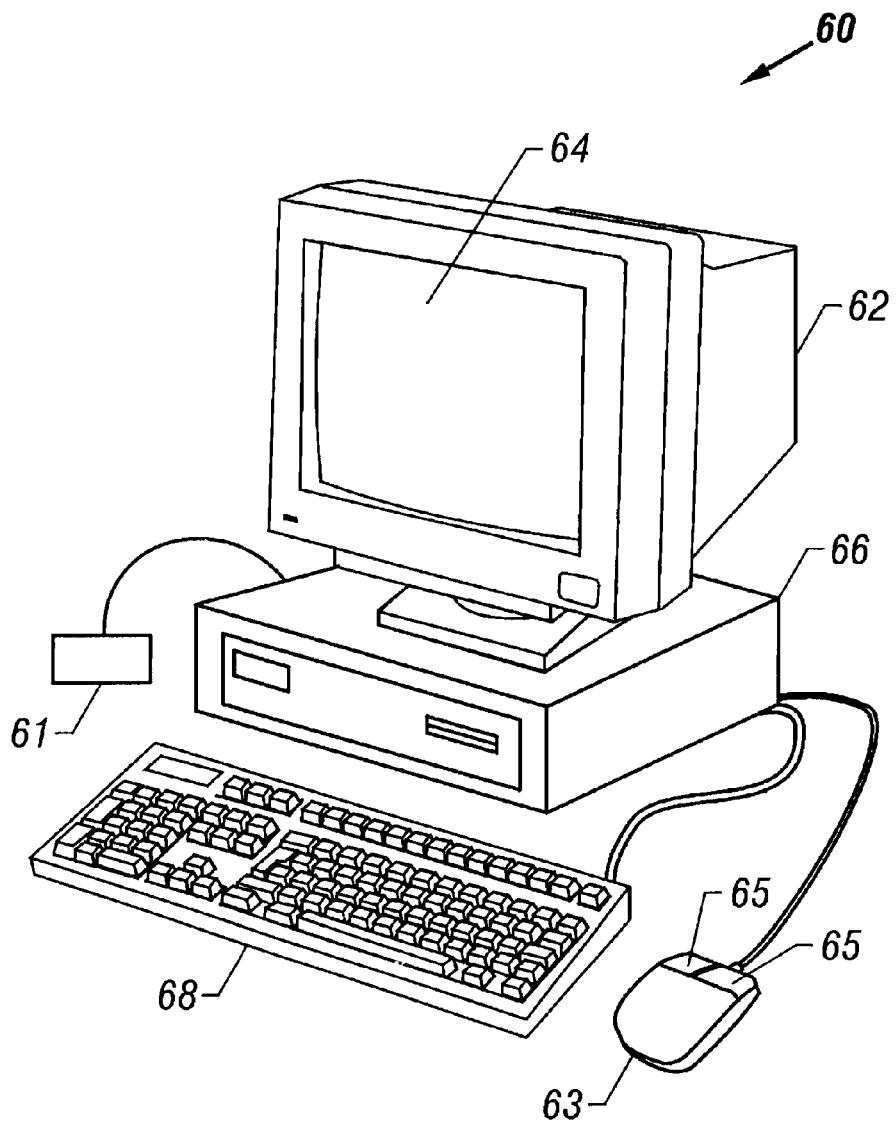
FIG. 4 is an example of a computer system in which the present invention may be implemented.

FIG. 4 depicts a subscriber computer system 60 that can run a browser. The computer system 60 includes a display device 62 (such as a monitor), a display screen 64, a cabinet 66 (which encloses components typically found in a computer, such as CPU, RAM, ROM, video card, hard drive, sound card, serial ports, etc.), a keyboard 68, a mouse 63, and a modem 61. Mouse 63 may have one or more buttons, such as buttons 65. The computer requires some type of communication device such as modem 61 that allows the computer system 60 to be connected to the Internet.

Figure 5:
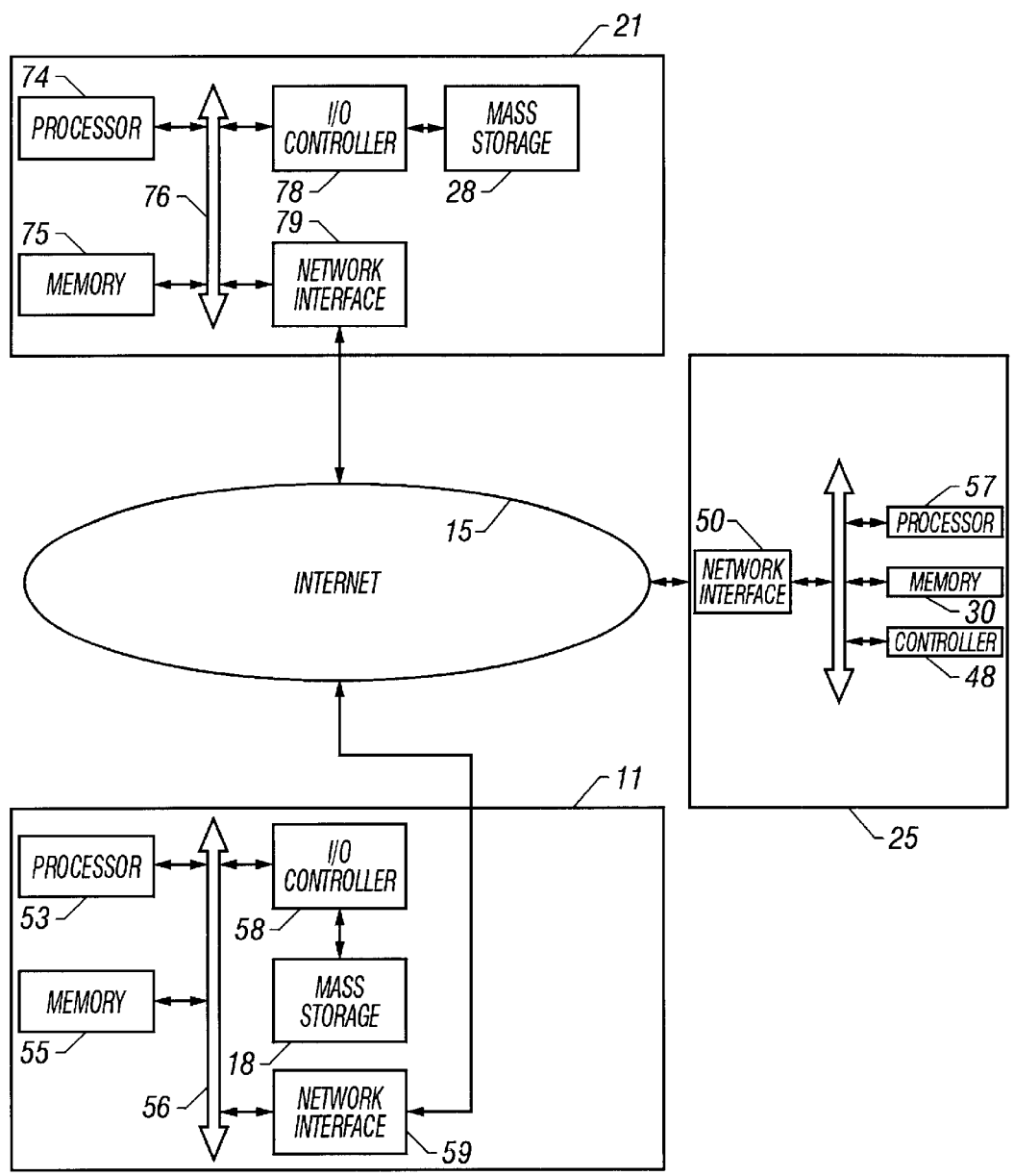
FIG. 5 illustrates an example of two servers or a server and a cellular telephone connected through a network.

FIG. 5 depicts an example of a remote server 21, cellular telephone 25, or voice mail server 11 connected through the Internet 15. In this example, a remote server 21 is connected through the Internet 13 to the voice mail server 11 or a cellular telephone 25. The remote server 21 includes conventional components such as a processor 74, memory 75 (e.g. RAM), a bus 76 that couples the processor 74 and memory 75, a mass storage device 28 (e.g. a magnetic hard disk or an optical storage disk) coupled to the processor and memory through an I/O controller 78 and a network interface 79, such as a conventional modem. The voice mail server 11 also includes conventional components such as a processor 53, memory 55 (e.g. RAM), a bus 56 that couples the processor 53 and memory 55, a mass storage device 18 (e.g. a magnetic hard disk or an optical storage disk) coupled to the processor 53 and memory 55 through an I/O controller 58 and a network interface 59, such as a conventional modem.

It will be appreciated from the description below that the present invention may be implemented in software that is stored as executable instructions on a computer readable medium on the computer systems or in the cellular telephone, such as mass storage devices 28 and 18 respectively, or in memories 55, 75, or 30 respectively.

Figure 6:
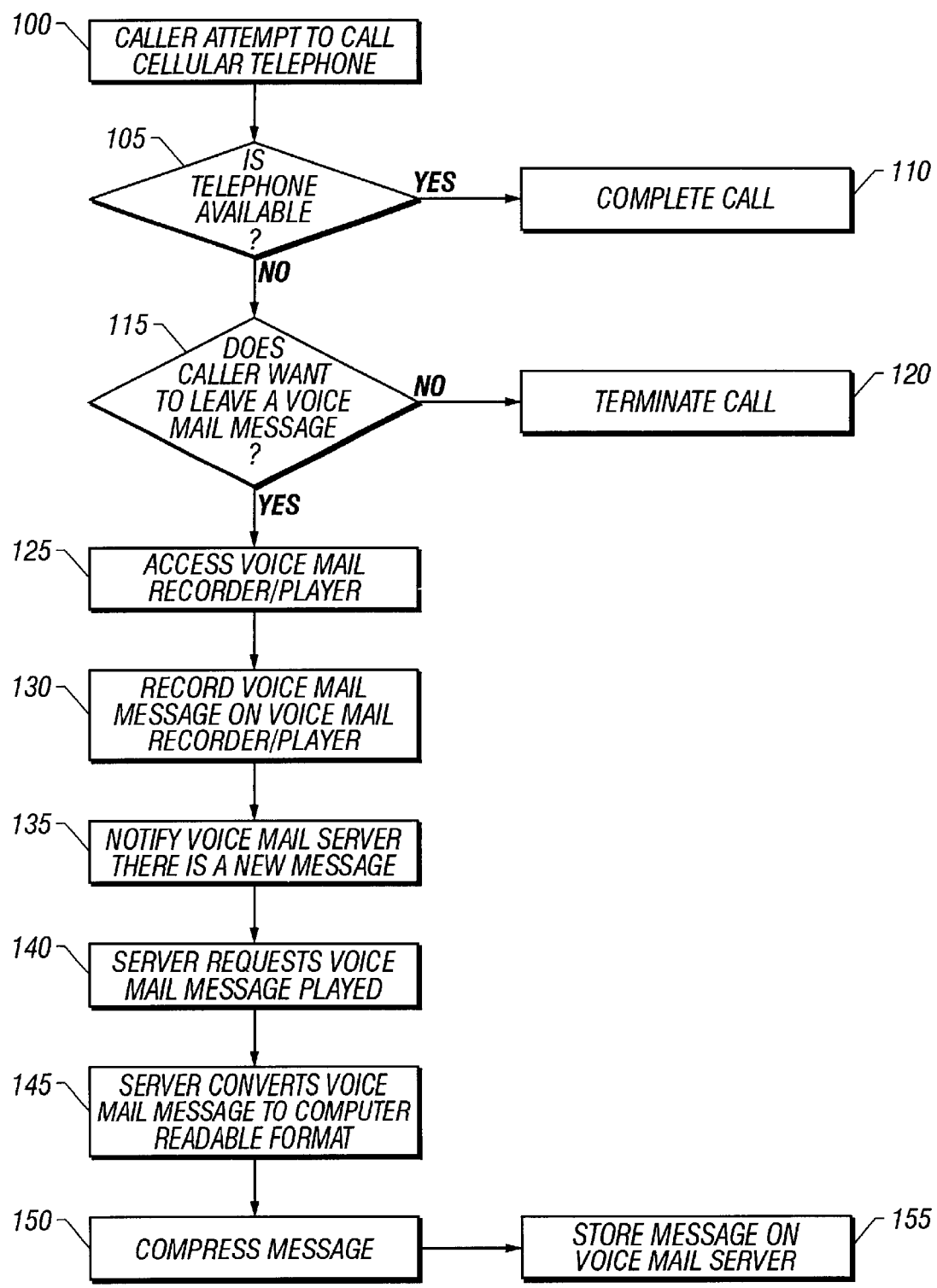
FIG. 6 is a flow chart of a method for recording a caller's voice message and storing it on a remote server.

FIG. 6 is a flow chart of a method that may be executed on the system of FIG. 1. The method includes recording a caller's voice mail message and storing it on the drive of the voice mail server. In state 100, an outside caller attempts to connect with a cellular telephone. In state 105, the cellular telephone is available, and then in state 110 the call is completed. In state 105, the cellular telephone is not available, and in state 115 the outside caller does not want to leave a voice mail message, then in state 120, the call is terminated. In state 115, an outside caller decides to leave a voice mail message then, in state 125, the caller accesses the voice mail recorder/player, and records a voice mail message in state 130. In state 135, the voice mail recorder/player notifies the voice mail server that there is a new voice mail message. In state 140, the voice mail server requests the voice mail recorder/player to play the voice mail message and, in state 145, converts the voice mail message to a computer readable format, such as WAV. In state 150, the voice mail server compresses the voice mail message and in state 155, stores the voice mail message on its drive.

Alternatively, the voice mail message could be recorded directly by the voice mail server, thereby eliminating the voice mail recorder/player. In this embodiment, the voice mail server would record the message and also play the message when accessed by a subscriber retrieving voice mail messages. Optionally, the voice mail server could periodically scan the voice mail recorder/player searching for new messages instead of, as in state 135, being notified of each new message. The present invention does not require that the message be compressed before storing it on the hard drive.

Figure 7:
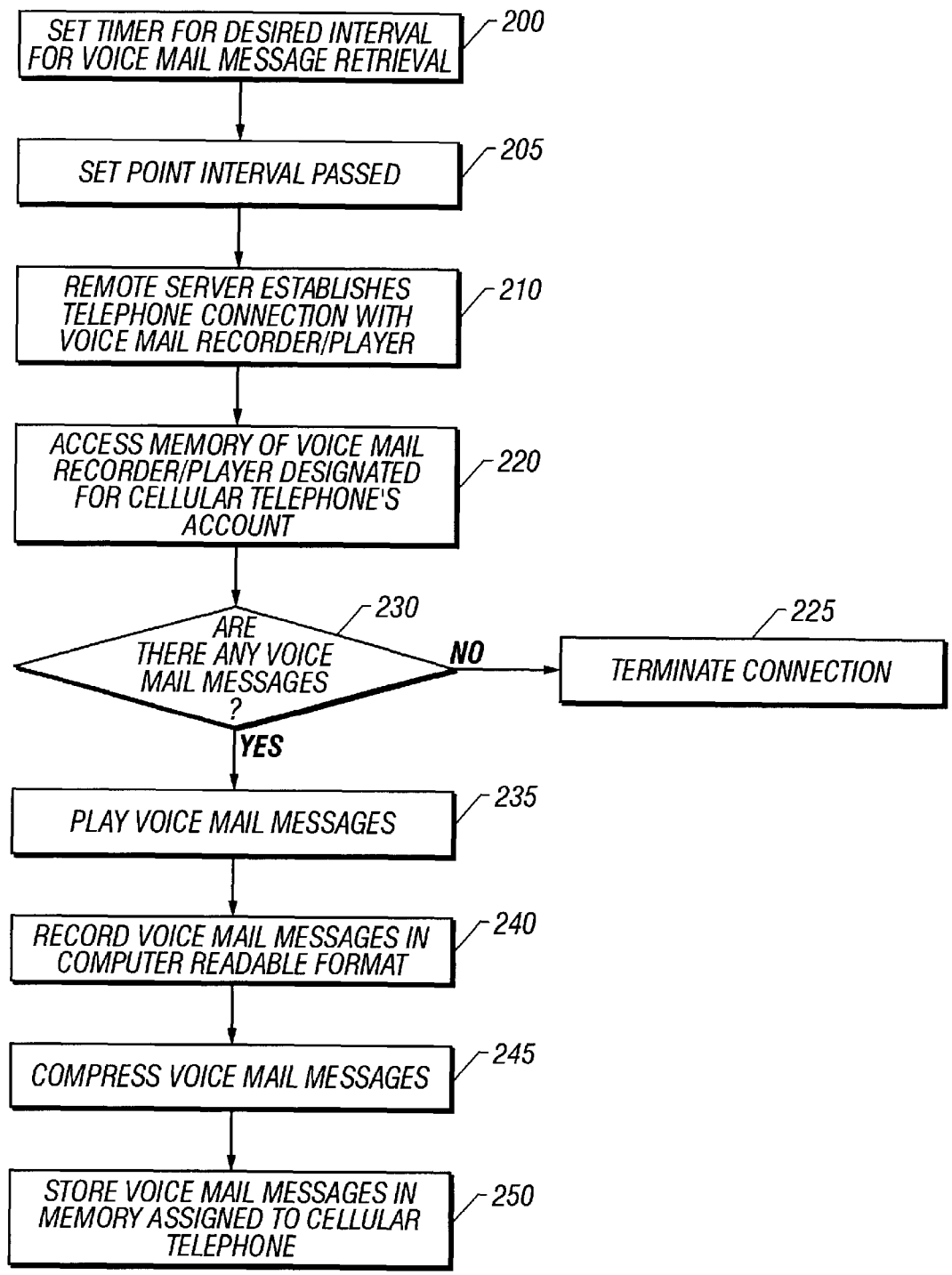
FIG. 7 is a flow chart of a method for the retrieval and recording of a voice message by a remote server over a telephone connection.

FIG. 7 is a flow chart of a method that may be executed on the system of FIG. 1. The method includes retrieving and recording a voice mail message by a remote server via a telephone connection. In this embodiment, the voice mail recorder/player delivers a voice mail message only in a playback-spoken format, not in a computer readable format. In state 200, a timer is set for the desired setpoint interval for the remote server to retrieve voice mail messages. In state 205, the set point interval expires. In state 210, the remote server establishes a telephone connection, using a modem or similar device, with the voice mail recorder/player. Alternatively, manual initialization of the connection would be acceptable without the timer.

In state 220, the remote server accesses that portion of the voice mail recorder/player's memory designated for the particular cellular telephone's account, and in state 230, determines if there are any voice mail messages waiting. If there are, in state 235 the remote server instructs the voice mail recorder/player to play the voice mail messages, and in state 240, the remote server records the voice mail messages in computer readable format. In state 245, the remote server compresses the voice mail messages to maximize available memory for storing additional voice mail messages. In state 250, the compressed voice mail messages are stored on the remote server's hard drive or other computer readable medium. The present invention does not require that the message be compressed before storing it on the hard drive. Alternatively, any suitable computer, for example a personal computer with a modem, could replace the remote server.

Figure 8:
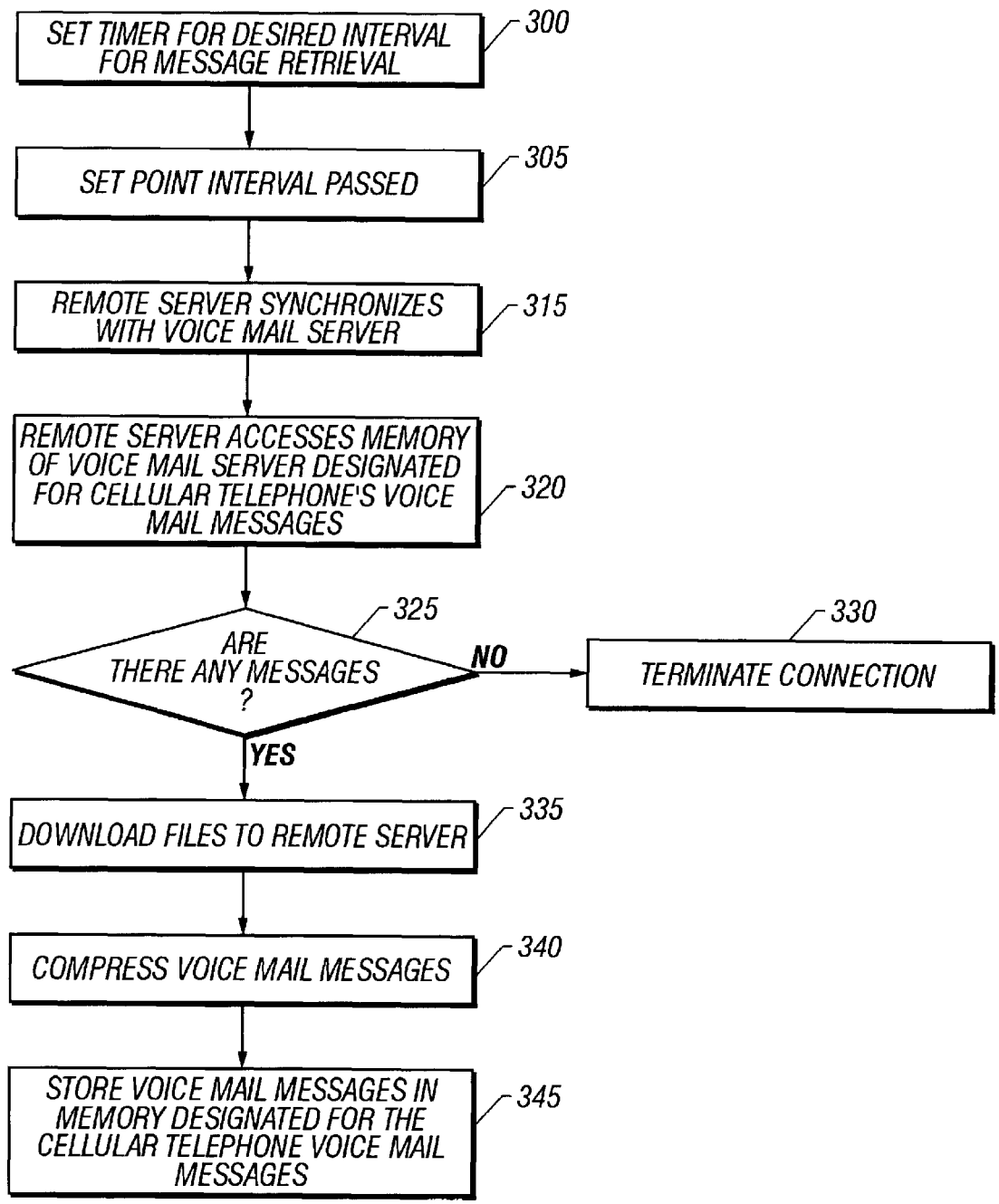
FIG. 8 is a flow chart of a method for a remote server to automatically download messages in computer readable format from a server of a cellular network.

FIG. 8 is a flow chart of a method that may be executed on the system of FIG. 1. The method is an alternative to that shown in FIG. 7 and includes downloading voice mail messages in computer readable format from the voice mail server. In state 300, a timer is set for the desired setpoint interval for the remote server to retrieve voice mail messages. In state 305, the set point interval expires. In state 315, the remote server synchronizes with the voice mail server over the Internet. Alternatively, manual initialization of the connection would be acceptable without the timer.

In state 320, the remote server accesses that portion of the voice mail server's memory designated for the particular cellular telephone's account, and in state 325, determines if there are any voice mail messages waiting. If there are, in state 335 the voice mail server downloads any voice mail message files to the remote server. In state 340, the remote server compresses the voice mail messages to maximize available memory for storing additional voice mail messages. In state 345, the compressed voice mail messages are stored on the remote server's hard drive or other computer readable medium. The present invention does not require that the message be compressed before storing it on the hard drive. Alternatively, any suitable computer, for example a personal computer capable of synchronizing with the voice mail server, could replace the remote server.

Figure 9:
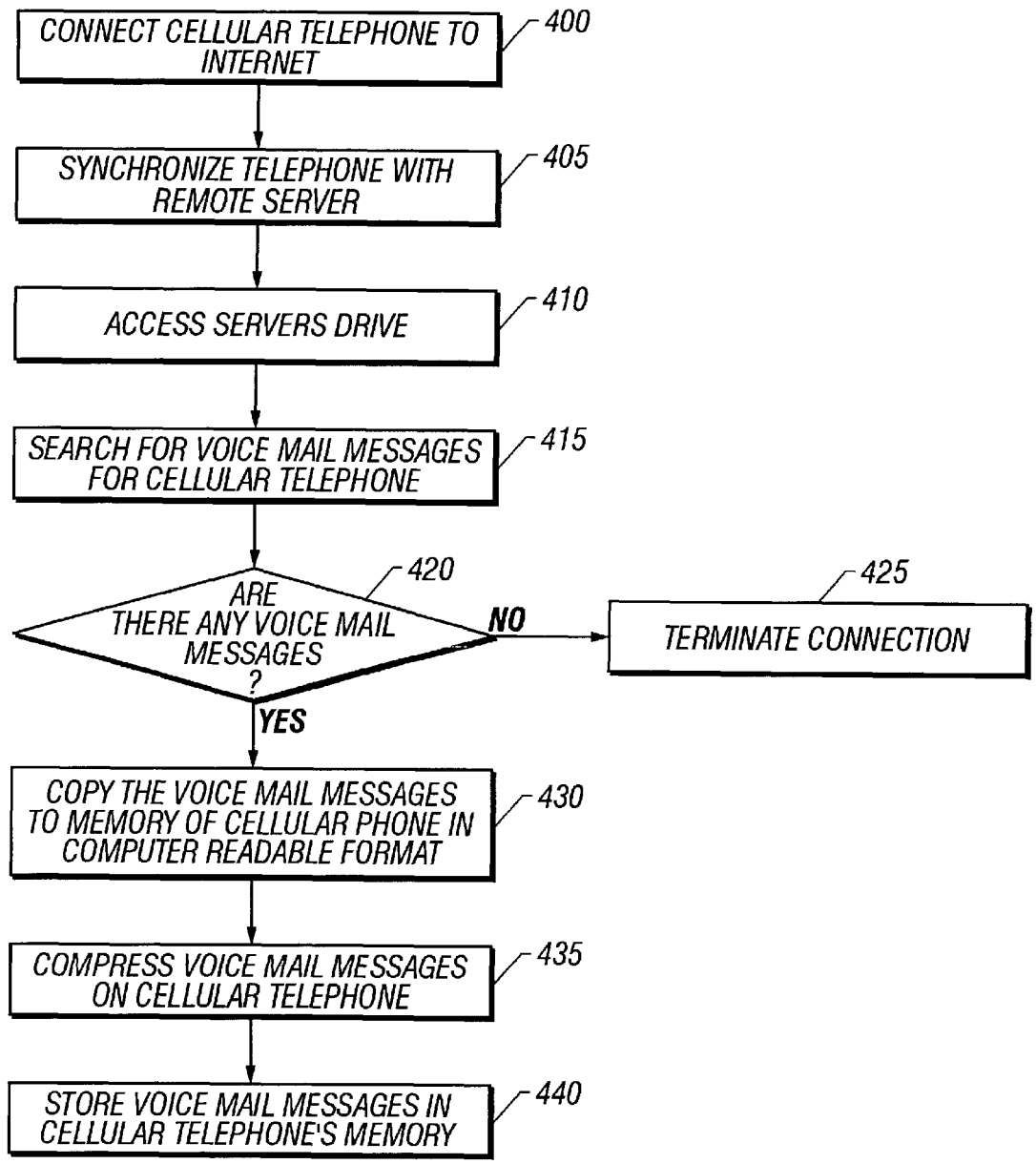
FIG. 9 is a flow chart of a method for a cellular telephone to download messages in computer readable format from a server of a cellular network.

FIG. 9 is a flow chart of a method that may be executed on the system of FIG. 1. The method includes a cellular telephone retrieving voice mail messages in computer readable format from the remote server. In state 400, a cellular telephone is connected to the Internet and, in state 405, synchronized with the remote server. Alternatively, the cellular telephone could synchronize with the voice mail server or a personal computer, or any other suitable computer storing voice mail messages for the cellular telephone. In state 410, the cellular telephone accesses the remote server's drive or other computer readable medium. In state 415, the cellular telephone searches for voice mail messages on the remote server in the area or account designated for voice mail messages for the cellular telephone. If in state 420, no voice mail messages are found, then in state 425, the connection is terminated. If in state 420, voice mail messages are found, in state 430, the cellular telephone downloads the voice mail messages in computer readable format from the remote server to the memory of the cellular telephone. In state 435, the cellular telephone compresses the voice mail messages to maximize available memory for storing additional voice mail messages. In state 440, the compressed voice mail messages are stored in the cellular telephone's memory. The present invention does not require that the voice mail messages be compressed before storing the voice mail messages in memory.

Figure 10:
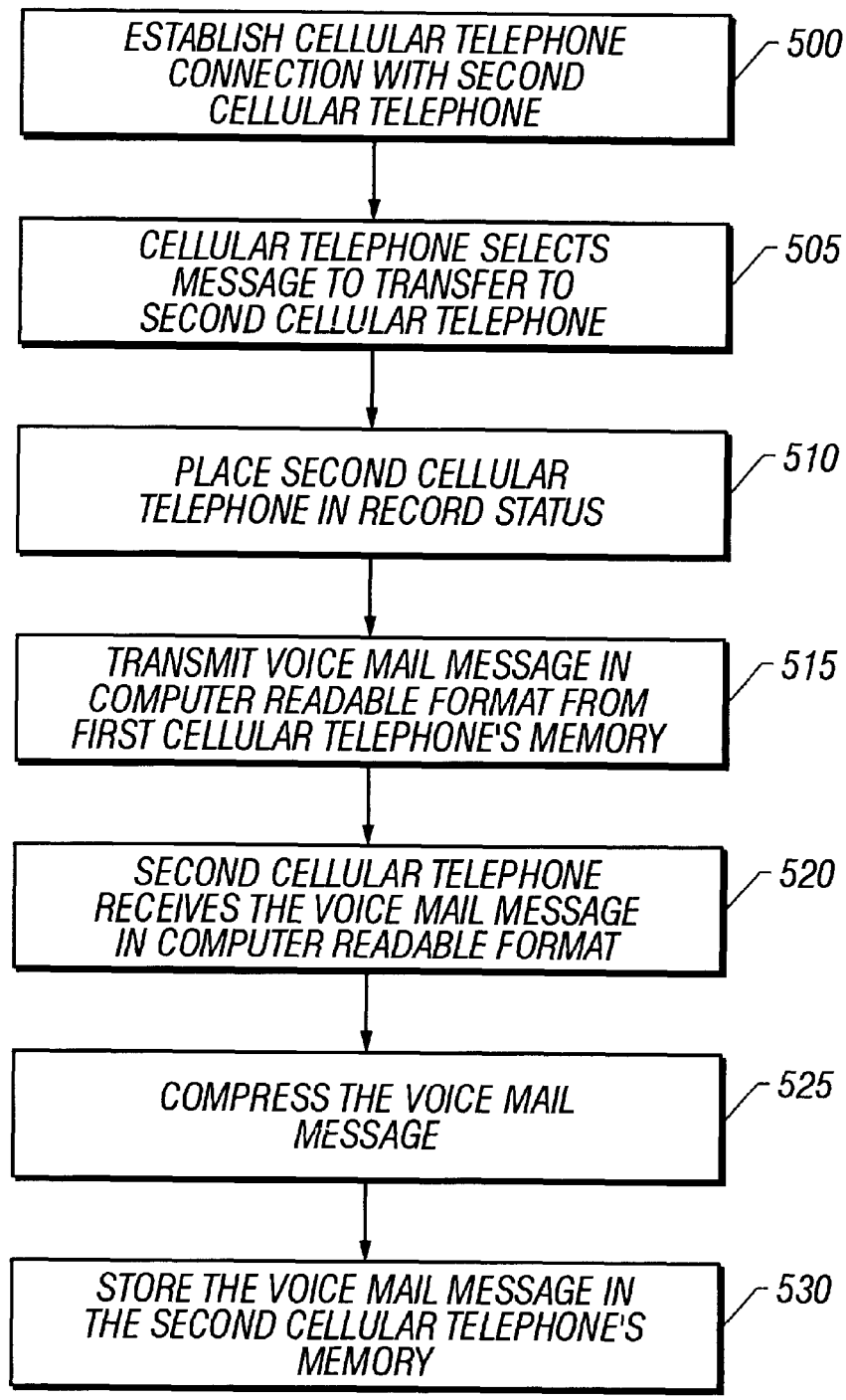
FIG. 10 is a flow chart of a method for recording a voice mail message by one cellular telephone from another cellular telephone.

FIG. 10 is a flow chart of a method that may be executed on the system of FIG. 1. The method includes recording a voice mail message on one cellular telephone from another cellular telephone. In state 500, a cellular telephone establishes a cellular telephone connection with a second cellular telephone. In state 505, the cellular telephone selects a voice mail message to transfer from its memory to the second cellular telephone. In state 510, the second cellular telephone is in record status. In state 515, the voice mail message is transmitted from the first cellular telephone's memory to, in state 520, the second cellular telephone's memory in computer readable format, such as WAV. In state 525, the second cellular telephone may compress the voice mail message and then, in state 530, store the voice mail message in the second cellular telephone's memory. In another embodiment, the message may have been transferred in a pre-compressed format to another computer readable medium. However, the present invention does not require that the voice mail messages be compressed before storing the voice mail messages in memory.

Figure 11:
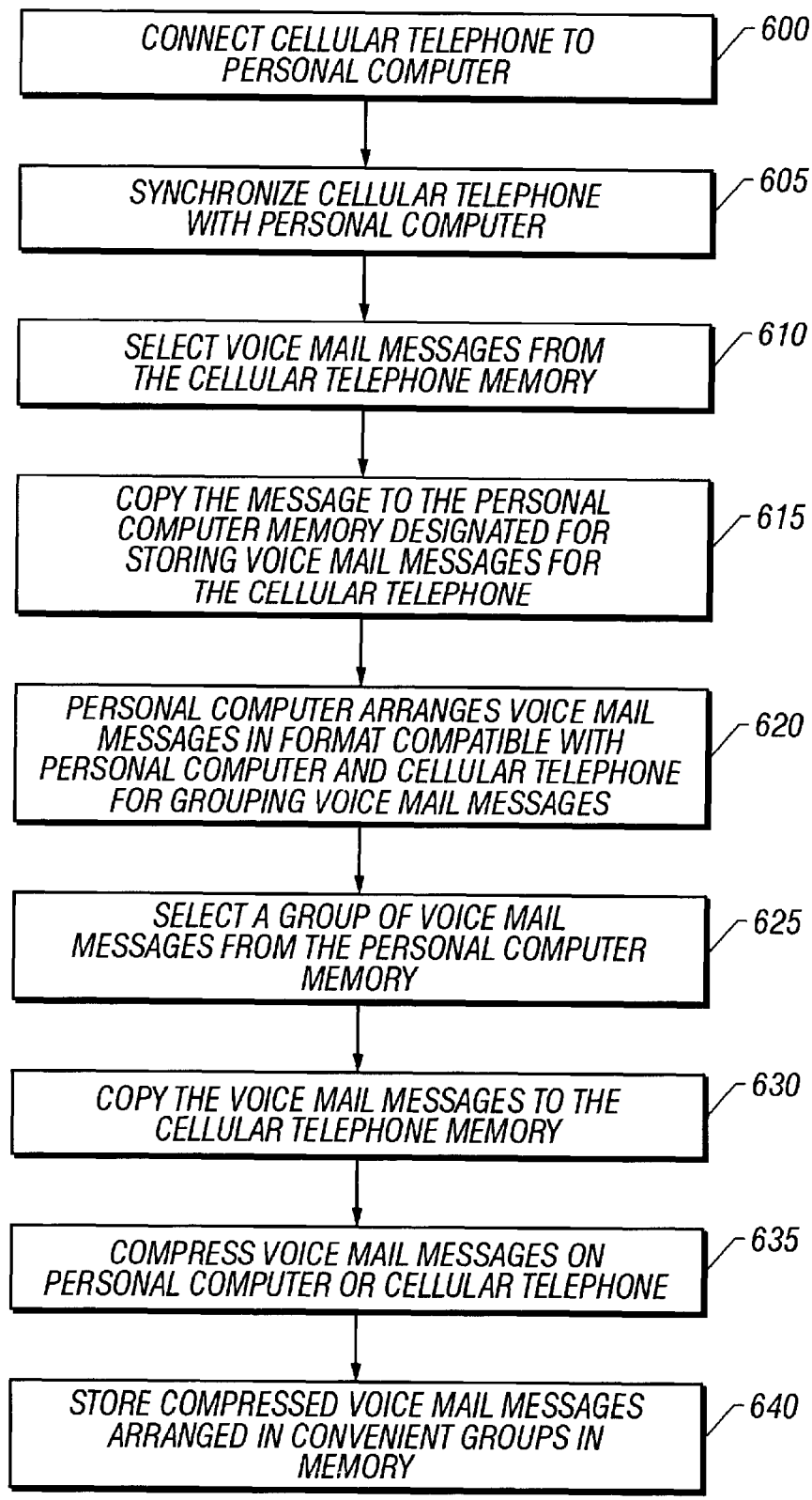
FIG. 11 is a flow chart of a method for arranging voice messages stored in a cellular telephone or on a personal computer into convenient groups in a format compatible with the personal computer and cellular telephone.

FIG. 11 is a flow chart of a method that may be executed on the system of FIG. 1. The method includes arranging voice mail messages stored in the memory of a cellular telephone or on a personal computer into convenient groups, directories, or folders in a format compatible with both the personal computer and cellular telephone. In state 600, the cellular telephone is connected to a personal computer and, in state 605, synchronized with it. In state 610, the cellular telephone selects voice mail messages from its memory and, in state 615, downloads the voice mail messages from the cellular telephone's memory in computer readable format to the area on the personal computer's drive designated for storing voice mail messages associated with the cellular telephone. In state 620, voice mail messages stored on the personal computer are arranged in convenient groups, folders, or directories compatible with the personal computer and cellular telephone. In state 625, the personal computer selects one or more convenient groups from its memory and in state 630, downloads these groups of voice mail messages in computer readable format, such as WAV, to the memory of the cellular telephone to facilitate retrieval when they are needed. In state 635, voice mail messages may be compressed in either the personal computer or the cellular telephone to maximize available memory for storing additional voice mail messages. In state 640, the voice mail messages arranged in convenient groups, are stored in the cellular telephone's memory. The present invention does not require that a message be compressed before storing it in memory. Alternatively, any suitable computer, for example the remote server, could replace the personal computer of this method.

While the foregoing is directed to the preferred embodiment of the present invention, other and further embodiments of the invention may be devised without departing from the basic scope thereof, and the scope thereof is determined by the claims that follow.

We claim:

1. In a voice mail system having a central voice message server for delivering voice messages to a first cellular telephone, a method comprising:
   storing a voice signal as a voice message on the central voice message server;
   selecting, using the first cellular telephone, whether the central voice message server will transmit the stored voice message in a digital voice stream format at a playback transmission rate or in a computer file format at a file storage rate;
   transmitting the stored voice message from the central voice message server to the first cellular telephone in the selected format; and
   transferring the voice message wirelessly from the first cellular telephone to a second cellular telephone, either in stream format at a playback transmission rate or in a computer file format at a file storage rate, without interaction with the central voice message server.

2. The method of claim 1, further comprising:
   receiving the voice message in the first cellular telephone; and
   storing the voice message in a computer readable medium in the first cellular telephone.

3. The method of claim 2, further comprising:
   compressing the voice message before storing the voice message in the first cellular telephone.

4. The method of claim 1, wherein the step of storing the voice message further comprises:
   a caller requesting to leave a voice message on the central voice message server;
   recording the voice message on the central voice message server in a computer readable format; and
   storing the voice message in memory designated for the voice message.

5. The method of claim 4, wherein the voice message is compressed before storing in memory.

6. The method of claim 1, further comprising:
   synchronizing the first cellular telephone with the central voice message server;
   accessing memory designated for voice messages in the central voice message server;
   downloading to the first cellular telephone any messages found in the designated memory; and
   storing the voice messages in memory of the first cellular telephone.

7. The method of claim 6, wherein the voice messages are compressed before storing in the memory of the first cellular telephone.

8. The method of claim 6, wherein the messages are compressed before downloading any messages to the first cellular telephone.

9. The method of claim 1, wherein the step of transferring the voice message further comprises:
   establishing a wireless link between the first and second cellular telephones;
   selecting the voice message to transfer from the memory of the first cellular telephone;
   transmitting the voice message from the first cellular telephone to a receiver of the second cellular telephone in computer readable format;
   receiving the voice message by the second cellular phone; and
   storing the voice message in memory of the second cellular telephone.

10. The method of claim 9, wherein the voice message is compressed before storing in the second cellular telephone's memory.

11. The method of claim 1, further comprising:
    synchronizing the first cellular telephone with a personal computer;
    selecting the voice mail message from computer readable medium of the first cellular telephone; and
    copying the selected message from the computer readable medium of the first cellular telephone to memory in the personal computer.

12. The method of claim 11, further comprising:
    organizing voice messages on the personal computer into a grouping of voice messages in a format compatible with the personal computer and the first cellular telephone; and
    copying the grouping of voice mail messages from the personal computer to the first cellular telephone, whereby the grouping facilitates quick retrieval of a voice message in the grouping.

13. A first cellular telephone comprising:
    a radio frequency unit enabling transmission and reception of voice messages between the first cellular telephone and a central voice message server;
    a voice output means;
    a memory for storing one or more of the voice messages received from the central voice message server;
    an input/output device allowing user-selection of a first operation or a second operation, wherein the first operation requests and receives voice messages through the radio frequency unit from a voice message server as a digital voice stream for immediate playback through the voice output means and the second operation requests and receives voice messages from the voice message server as a digital computer file for storage in the memory, and wherein the input/output device allows user-selection of a third operation, wherein the third operation transmits a voice message from the memory through the radio frequency unit to a second cellular telephone as either a digital voice stream or as digital computer file for storage in a memory of the second cellular telephone, without interaction with the voice message server.

14. The first cellular telephone of claim 13, wherein the memory can playback voice messages through the voice output means.

* * * * *

UNITED STATES PATENT AND TRADEMARK OFFICE
CERTIFICATE OF CORRECTION

PATENT NO. : 6,751,298 B2
DATED : June 15, 2004
INVENTOR(S) : Kulvir Singh Bhogal, Nizamudeen Ishmael, Jr. and Javid Jameossanaie It is certified that error appears in the above-identified patent and that said Letters Patent is hereby corrected as shown below:

Column 3,
Line 12, after the phrase "are therefore not", please insert -- to --.

Column 6,
Line 60, after the phrase "In state 105," insert -- if --.
Line 61, after "telephone is available," delete "and".
Line 62, after the phrase "In state 105," insert -- if --.
Line 65, after the phrase "In state 115," insert -- if --.

Column 8,
Line 42, after the phrase "phone is" insert -- placed --.

Signed and Sealed this

Third Day of May, 2005

JON W. DUDAS
*Director of the United States Patent and Trademark Office*